United States Patent [19]
Deckebach

[11] 4,439,141
[45] Mar. 27, 1984

[54] RECUPERATIVE DOUBLE CHAMBER ROTARY FURNACE

[76] Inventor: George J. Deckebach, 6553 Wesselman Rd., Cincinnati, Ohio 45248

[21] Appl. No.: 374,930

[22] Filed: May 5, 1982

[51] Int. Cl.³ .................. F27B 15/00; F27B 7/02; F26B 11/02; F28D 11/02
[52] U.S. Cl. .................. 432/14; 34/128; 165/89; 432/83; 432/106; 432/113
[58] Field of Search .................. 432/82, 83, 103, 106, 432/113, 14; 165/89; 34/128

[56] References Cited

U.S. PATENT DOCUMENTS

| | | | |
|---|---|---|---|
| 822,022 | 5/1906 | Schaeffer | 432/110 |
| 1,551,152 | 8/1925 | Hiller | 34/128 |
| 1,898,480 | 2/1933 | Corkill | 432/106 |
| 2,788,204 | 4/1957 | Kalling et al. | 165/88 |
| 4,262,429 | 4/1981 | Avril | 34/128 |
| 4,383,379 | 5/1983 | Avril | 34/128 |

FOREIGN PATENT DOCUMENTS 157598 10/1932 Switzerland .................. 34/128

Primary Examiner—John J. Camby
Attorney, Agent, or Firm—Thomas M. Farrell

[57] ABSTRACT

An apparatus that is designed to heat a flowable granular material up to an elevated temperature and cool the material back down to a temperature that is as close as possible to the temperature of the incoming material before exiting, where a substantial portion of the heat transferred in both heating the incoming material up and cooling the outgoing material back down is not being accomplished by outside heat sources and heat sinks, but rather by transferring heat from outgoing material to incoming material on a more or less direct basis. This is to be accomplished by an apparatus that is comprised of two coaxial cylinders rotating about their common axis whereby feed material enters and exits from one end, and a heat source is provided at the opposite end. Feed material enters into the inner chamber and travels towards the heat source. After passing the heat source, feed material transfers to the outer chamber where it moves in a direction opposite incoming feed material and exits the same end that it entered. The feed material, before exiting, transfers a substantial portion of its heat to the incoming material, effectively recuperating heat.

8 Claims, 5 Drawing Figures

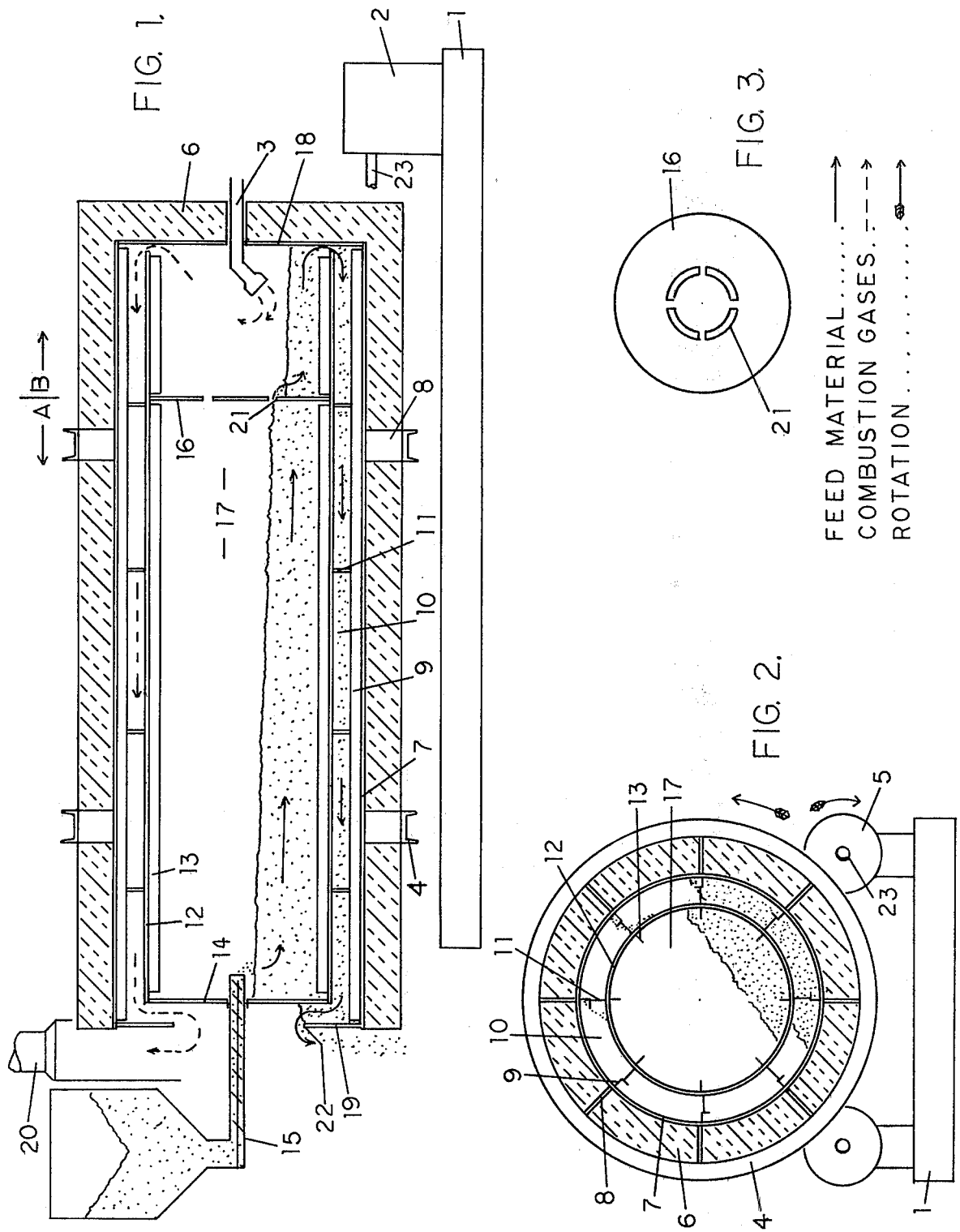

RECUPERATIVE DOUBLE CHAMBER ROTARY FURNACE

BACKGROUND OF THE INVENTION

1. Field of Invention

The invention relates to the foundry industry where common practice today is to purchase new clean sand found in natural deposits to replace a portion of sand used in the production of molds and cores where organic and inorganic contaminents from binders and other additives have built up to an objectionable level. As an alternative, "thermally reclaimed" sand (i.e. sand that is heated to a high enough temperature to partially or completely remove organic material, and alter properties of inorganics so that they may be removed more easily by some other means, such as mechanical scrubbing) may be used in lieu of purchasing new sand and dumping contaminated sand. In this particular case elevated temperature is required to promote certain chemical and physical reactions, but not necessary in the end product. In most cases elevated temperature would actually be detrimental, because typical foundry processes require sand to be at or near ambient temperature for the production of molds and cores. Although the invention is based upon conditions and processes described above, it may find application in other areas, such as calcining, or ore roasting.

2. Description of Prior Art

In searching for prior art, U.S. Pat. No. 2,788,204 discloses a device that is designed, to accomplish essentially the same result, although by substantially different means. Similarities include using a rotating drum and having an outside heat source. However, heat transfer between incoming and exiting material is being accomplished through a series of chambers that have walls perpendicular to the axis of rotation with small openings or passageways for the material to move from one compartment to another. This device has several inherent disadvantages: 1. Construction of the heat exchange chamber would be difficult and costly. 2. Once assembled, maintenance on inner compartments would almost by impossible.

U.S. Pat. No. 822,022 discloses a double wall rotating drum device that is essentially an oven designed to dry sand and gravel. Similarities between this device and the present invention include using a double wall rotating drum and an outside heat source. However the device, as designed, will not accomplish effectively the results desired. First, the heat source is located at the same end at which feed material enters and exits. This will tend to promote the opposite effect wanted. In this situation the incoming material and the exiting material are closest to the heat source. The point where material transfers from one chamber to another is farthest away from the heat source. The net effect would be a rather "flat" temperature curve if one would monitor the temperature of a particle of material going through the device and plot temperature vs. time. If there is heat transfer between the two chambers, it would even be questionable which way the transfer is taking place. Close inspection at the feed end might show that while the incoming material is colder than the outgoing material, the actual temperature of the inner wall at this point, being in direct contact with combustion gases, may be higher than either material, thereby causing a transfer of heat from the inner wall to the out going material, which would result in the opposite effect wanted.

Besides the location of the heat source, other design characteristics of this device do not lend themselves to accomplish the results desired. This device is designed to heat relatively large tonnages of material to a relatively low temperature for the removal of moisture. A relatively large portion of the heat produced by the heat source is used for heat of evaporation. The present invention is required to heat the material to a much higher temperature. In the case of thermally reclaiming foundry sands, a maximum temperature of 1500 F. or even higher would not be uncommon. Since the thermal conductivity of sand is very poor, maximum temperatures required are high, and in the end an elevated temperature of the exit material is not required; certain other design characteristics must be maintained for which U.S. Pat. No. 822,022 does not take into consideration.

The following factors must be controlled and optimized in order efficiently recuperate heat between outgoing and incoming materials:

1. Maintaining a rather slow flow rate of feed material through the inner and outer chambers.
2. Maintaining a large volume of material in both chambers (which in combination with the slow flow rate will provide a high retention time.)
3. Keeping the feed material in as much motion as possible, done in such a manner as to also keep material homogenized thereby minimizing temperature gradients through the material.
4. Providing the best conditions possible for maximum heat transfer utilizing concepts of convection, radiation, and direct conduction.
5. Providing a condition where the inner wall can be made very thin, yet structurally sound enough to support the load, thereby maximizing heat transfer through the wall.
6. Providing a means of isolating as much as possible the high temperature heat source from directly heating the incoming material at the feed inlet end, while still recuperating as much heat as possible from the flue gas (if heated with a combustion burner.)
7. If in a particular case where the feed material may contain organics, and if in the process of heating, usable gases are given off, an efficient means of combusting these gases and utilizing the heat given off from the same.

It is to these ends unique solutions have been developed and designed, and consequentially embody the present invention.

SUMMARY OF THE INVENTION

The object of the invention is to provide a means of heating a flowable granular material to an elevated temperature whereby a major portion of the heat required to reach the required elevated temperature is transfered from the material leaving the apparatus into the material entering the apparatus.

This is accomplished by an apparatus that has two coaxial cylinders whereby feed material is introduced into the inner chamber at the feed end, material flows at a controlled of flow and retention time to the opposite end where the outside heat source is located, material is transfered to the outer chamber, and then material flows at a controlled rate and retention time in the opposite direction of material flow in the inner chamber through the outer chamber past the end where it entered the inner chamber, then discharged. As this occurs, heat is constantly being transfered from the outer chamber through the inner cylinder wall into the material in the inner chamber, thereby effectively recuperating heat.

In order to further optimize the recuperative heat transfer characteristics of the apparatus, additional design features have been incorporated in the apparatus. These include a means of separating the unit into two portions, the externally heated portion and the recuperative portion; a means of controlling the flow rates and retention times of material in each chamber; several means of forcing the material in the outer chamber to come in direct contact with the inner cylinder wall; a means of partially supporting the inner cylinder with the material in the outer chamber; a means of effectively recuperating heat from combustion gases, if combustion heating is used; and a means of effectively utilizing combustion gases generated in preheating the material, if incoming material contains some combustable material.

BRIEF DESCRIPTION OF DRAWINGS

FIG. 1. represents a sectional view of the invention where the section is taken through the axis of rotation and perpendicular to the invention's base.

FIG. 2. represents a sectional view along the line II—II of FIG. 4. This section is perpendicular to the axis of rotation. In this view, motor/drive unit 2 and weir/baffle plate 16 have been omitted.

FIG. 3. represents the inner cylinder weir/baffle plate. This view is perpendicular to the axis of rotation.

DESCRIPTION OF THE PREFERRED EMBODIMENT

Figure 4:
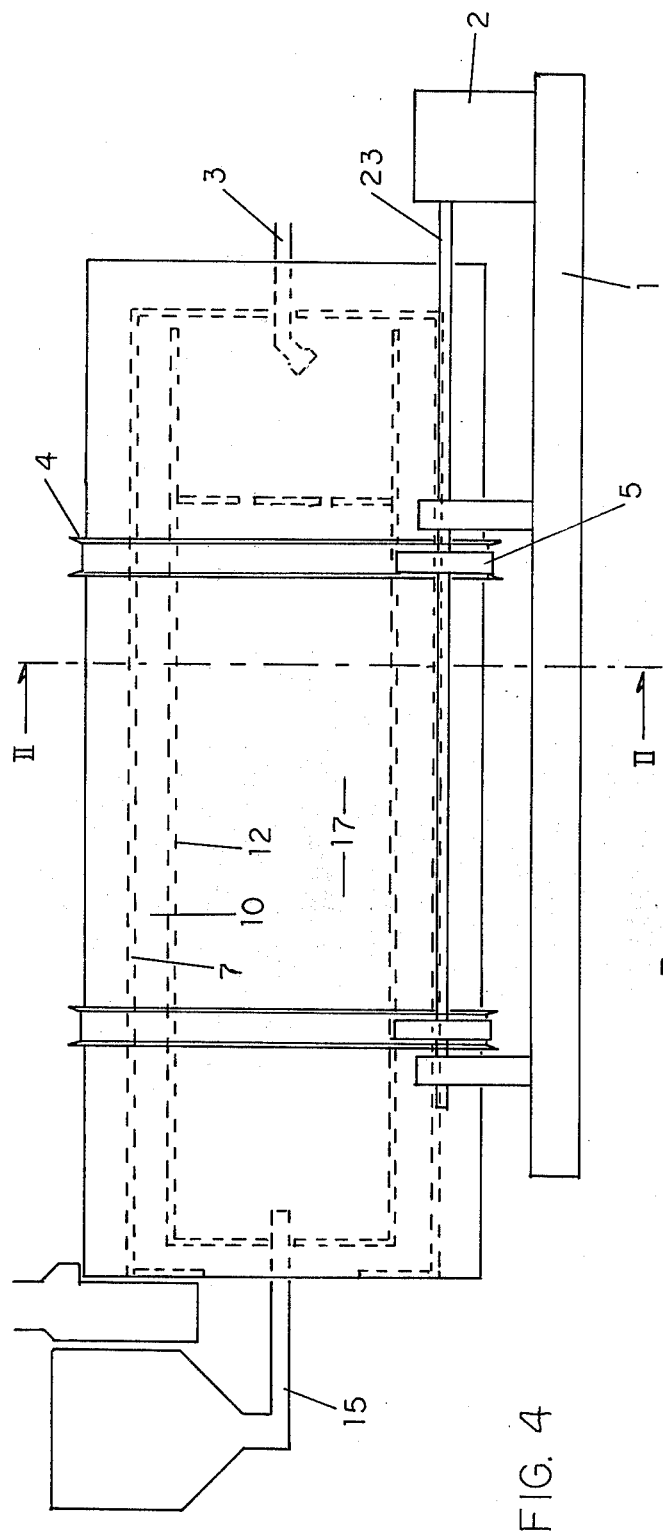
FIG. 4. represents a side elevation view.
Figure 5:
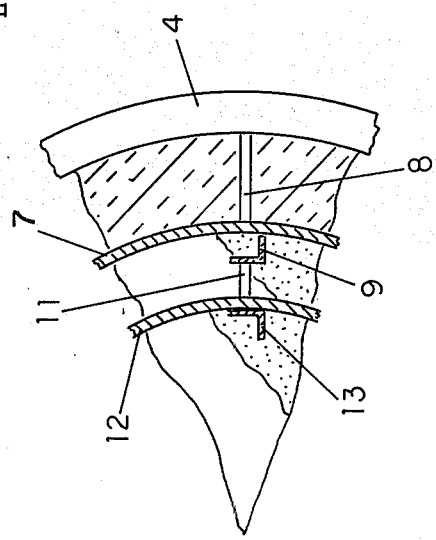
FIG. 5. represents an enlarged view of a segmental portion of FIG. 2.

The frame 1 supports the main body of the invention. A moter and drive unit 2 suitably rotates the main body of the invention by turning drive shaft 23, which turns the drive wheels 5. In this particular embodiment a gas burner 3 is used as a primary heat source. It is not the intention, however, to rule out the possibility of using electric or any other means as a primary heat source. Spacer rings 4 are driven by drive wheels 5 and leave room for insulation 6 around the entire outer cylinder 7. Spacers 8 will be suitably made to allow for thermal expansion between spacer rings 4 and the outer cylinder 7. Anti-slide/lifter bars 9 in the outer chamber 10 are separated by spacers 11. The inner cylinder 12 is also fitted with anti-slide bars 13. The inner cylinder end plate 14 is constructed so that a relatively tight air seal is obtained between the inner cylinder end plate 14 and the screw feeder 15. The inner cylinder weir/baffle plate 16 separates the recuperative side A of the device from the combustion side B, and also controls the flow characteristics of the inner chamber 17. The outer cylinder 7 is fitted with an outer cylinder end plate 18 which is designed to form a tight air seal with the gas burner 3. The outer cylinder 7 is also fitted at the opposite end with a specially sized outer cylinder weir 19 that is used to control the flow characteristics of material in the outer chamber 10. A vent stack 20 would be required to remove combustion gases from the working environment.

In operation, feed material at a controlled rate of flow enters the invention via screw feeder 15, and is deposited in the recuperative portion A end of the inner chamber 17. Because of the rotation of the inner chamber 17, a flowable granular material will tend to seek its own level. The net effect of this phenomenon will cause said material to move slowly towards the combustion portion B end of the invention. Anti-slide bars 13 are provided to keep material from sliding on the surface of the inner cylinder 12. This will impart a constant rolling motion to the feed material when the inner cylinder 12 revolves, thereby constantly mixing the feed material and constantly placing different particles of material in contact with the surface of the inner cylinder 12.

Once feed material has reached the inner cylinder weir/baffle plate 16, flow of material cannot continue past this plate until the level of material in the inner chamber 17 recuperative portion A reaches the level of the lip 21 of the inner cylinder weir/baffle plate 16. The placement of this weir 16 will insure a long retention time for feed material in the inner chamber 17 recuperative portion A and at the same time will insure that the feed material is constantly in contact with a relatively large percentage of the area of the inner cylinder 12 on a predictable basis. The inner cylinder weir/baffle plate 16 will also minimize any effect a change in feed rate would have on the retention time and contact area.

After the level of feed material in the inner chamber 17 recuperative portion A has reached the lip 21 of the inner chamber weir/baffle plate 16, material will spill over into the combustion side B of the inner chamber 17. The material will then continue to slowly move in the same direction as it moved in the recuperative portion B until it finds the end of the inner cylinder 12. At this point it will drop down into the outer chamber 10 and reverse direction back towards the feed end. In the outer chamber 10 anti-slide/lifter bars 9 are provided. These bars not only prevent sliding, but are also designed to lift feed material to an elevation that will cause the material to fall from the bars and cascade down the outside surface of the inner cylinder 12, thereby aiding heat transfer from the outer chamber 10 to the inner chamber 17. Once material reaches the outer cylinder weir 19, there will be no discharge of material from the outer chamber 10 until the outer chamber 10 is sufficiently filled to cause material to spill over the outer chamber weir lip 22. Once spill over occurs, the machine has reached steady state conditions with regard to material flow.

Again, as in the case of the inner chamber, use of the outer cylinder weir 19 insures that a long retention time in the outer chamber 10 is obtained. The outer chamber weir 19 is also designed in such a manner as to force the material in the outer chamber 10 to come in direct contact with the outside of the inner cylinder 12. This is accomplished by having the diameter of the outer cylinder weir lip 22 substantially smaller than the outside diameter of the inner cylinder 12. This, in effect, sandwiches the feed material in between the inner cylinder 12 and the outer cylinder 7. This "direct contact" provides for two key features: First, having feed material in both chambers in direct contact with the common inner cylinder 12 will greatly enhance heat transfer characteristics by providing a direct means of conduction between material in the outer chamber 10, the inner cylinder 12, and material in the inner chamber 17. Secondly, the material in the outer chamber 10 by being in contact with the inner cylinder 12, will act as support for the weight of the inner cylinder 12 and the feed material in the inner chamber 17, thereby allowing the wall thickness of the inner cylinder 12 to be reduced substantially and still provide adequate structural support. A reduction in wall thickness will further improve all types of heat transfer to material in the inner chamber 17, because all heat found in the outer chamber 10 (from the feed material itself, the atmosphere, or the outer cylinder wall) must ultimately be passed on by conduction through the inner cylinder 12.

As heat is supplied by the burner 3, the warmed material leaving the combustion portion B and traveling toward the exit end of the outer chamber 10 will transfer a substantial portion of its heat throught the inner cylinder 12 into the colder incoming feed material much in the same manner as counter flow heat exchange, thereby raising the temperature of the incoming material, or in effect preheating the incoming material. An additional benefit will be that as incoming material is heated up, the exiting material is also cooled down, thereby bringing the exit material to a lower temperature and consequentially requiring less auxillary equipment to process material into a reuseable condition.

Once the invention reaches thermodynamic equilibrium, a substantial portion of the temperature rise required to accomplish the desired reactions in the combustion chamber will be provided by the recuperative portion A of the furnace. The heat requirements of the burner 3 will be reduced to a point where it will only have to provide enough heat to make up for heat losses through the outer cylinder 7, and heat required to produce the difference in temperature between incoming and outgoing feed material that acts as a driving force for heat transfer.

Another unique feature of the furnace is the inner cylinder weir/baffle plate 16. It is designed to provide only a narrow slot for the feed material to transfer from the recuperative portion A to the combustion portion B. This, in combination with the close proxmity of the end of the inner cylinder 12 to the outer cylinder end plate 18, effectively isolates the combustion portion B from the recuperative portion A. The overall effect of this isolation is to enhance the recuperative aspects of the furnace.

In special situations, such as thermally reclaiming foundry sands, organic contaminents will produce volatile, combustable gases when heated in the recuperative portion A. By effectively sealing the feed entrance end as explained earlier, and by use of the inner cylinder weir/baffle plate, atmospheric oxygen and oxygen provided by the combustion burner 3 will not be able to enter the recuperative portion A of the inner chamber 17. This will eliminate the possibility of pre-combustion in the recuperative portion A. The gases generated in the recuperative portion A will then be forced to exit through the slots of the inner cylinder weir/baffle plate 16 by their own vapor pressure, where they will then be combusted in the combustion portion B by providing additional excess air or oxygen in the combustion gas mixture entering through the gas burner 3.

The vent stack 20 is located at the end opposite the gas burner 3. Because the screw feeder 15 is designed with a snug fit with respect to the inner cylinder end plate 14, and the burner 3 is also designed with a snug fit with respect to the outer cylinder end plate 18, the only natural path combusted gases may follow is through the outer chamber 10. This will allow heat to be recuperated from combustion gases without disturbing the inner chamber 17 recuperative portion A. If combustion gases from burner 3 would be allowed to travel through the inner chamber 17, any gases generated in the recuperative portion A of inner chamber 17 would be entrained away and wasted. Another benefit of this embodiment is that by forcing generated gases to travel through the combustion portion B, the burner 3 will act as an after burner. Many types of gases generated in the recuperative portion A, including smoke and complex hydrocarbons, will be broken down to carbon dioxide and water vapor, as they are forced through the combustion portion B, thereby eliminating the need for pollution control equipment.

I claim:

1. A recuperative rotary furnace for treating granular material, comprising:
   (a) a base;
   (b) a first cylinder rotatably mounted to said base, said first cylinder having an outer diameter, a central bore, a substantially closed end, and a substantially open end;
   (c) a second cylinder having an outer diameter smaller than said first cylinder bore, and further having a central bore, a substantially closed end, and a substantially open end, said second cylinder rotatably carried coaxially within said first cylinder bore and mounted with said second cylinder open end disposed towards said first cylinder closed end;
   (d) an inner end space maintained between said first cylinder closed end and said second cylinder open end;
   (e) an annular outer chamber maintained between said first cylinder bore and said second cylinder outer diameter, said annular chamber in communication with said inner end space;
   (f) drive means for rotating said first and second cylinders with respect to said base;
   (g) means for feeding granular material at a first temperature into said second cylinder bore through said second cylinder closed end;
   (h) means for continuously moving granular material through said second cylinder bore towards said second cylinder open end through said end space, and through said annular outer chamber toward said first cylinder open end;
   (i) means for heating granular material to a second temperature elevated above said first temperature in said second cylinder bore in a region substantially proximal to said end space; and
   (j) means for controlling the flow rate of granular material movement through said first and second cylinder bores.

2. The recuperative furnace of claim 1, further comprising a weir baffle plate affixed in, and subtending, said second cylinder bore, thereby forming a recuperative cylinder portion extending along said second cylinder bore from said second cylinder closed end to said weir baffle plate, and forming a combustion cylinder portion extending along said second cylinder bore from said weir baffle plate to said second cylinder open end, said weir baffle plate further having an opening therethrough to effect controlled through flow of granular material.

3. The recuperative furnace of claim 1, further comprising:
   (a) a cylinder weir affixed to said first cylinder open end, having a weir portion extending radially inward to a diametral dimension less than said first cylinder bore; and (b) an outer end space maintained between said second cylinder closed end and said cylinder weir, said outer end space in communication with said annular outer chamber.

whereby said cylinder weir will effect controlled flow of granular material through said annular outer chamber, through said outer end space and over said cylinder weir.

4. The recuperative furnace of claim 3, wherein said cylinder weir portion extends radially inward at least to a diamentral dimension equal to said second cylinder outer diameter.

whereby granular material is maintained in substantially constant contact with both said first cylinder bore and said second cylinder outer diameter for substantially the entire length of said second cylinder for at least a portion of the periphery of said second cylinder outer diameter:

5. The recuperative furnace of claim 1, further comprising a plurality of anti-slide lifter bars affixed to at least one of said first and second cylinders, said lifter bars longitudinally arrayed in said outer chamber.

6. The recuperative furnace of claim 5, further comprising a plurality of anti-slide lifter bars affixed to, and longitudinally arraged in said second cylinder bore.

7. The recuperative furnace of claim 1, further comprising vent means in communication with said first cylinder open end.

8. A method for treating granular material, comprising the following steps:

(a) selecting first and second cylinders, each having a bore, an outer diameter, a closed end, and an open end;

(b) supporting said first cylinder on a base with its cylindrical axis in a generally horizontal attitude;

(c) mounting said second cylinder coaxially within said first cylinder with its open end disposed towards and located proximal said first cylinder closed end;

(d) rotating said cylinders;

(e) feeding granular material into said first cylinder through said first cylinder closed end;

(f) moving said granular material continuously through said first and second cylinders;

(g) heating said granular material in a region proximal said second cylinder open end;

(h) venting heating combustion gases through said first cylinder closed end to said first cylinder open end.

* * * * *